No. 614,046. Patented Nov. 8, 1898.
J. W. & H. WHITE.
AERIAL ROPEWAY.
(Application filed July 8, 1898.)
(No Model.) 5 Sheets—Sheet 1.
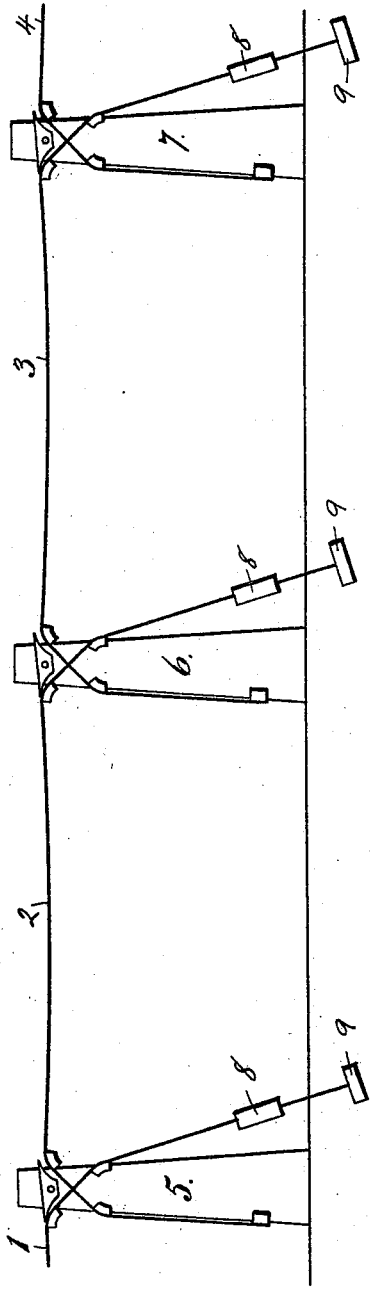
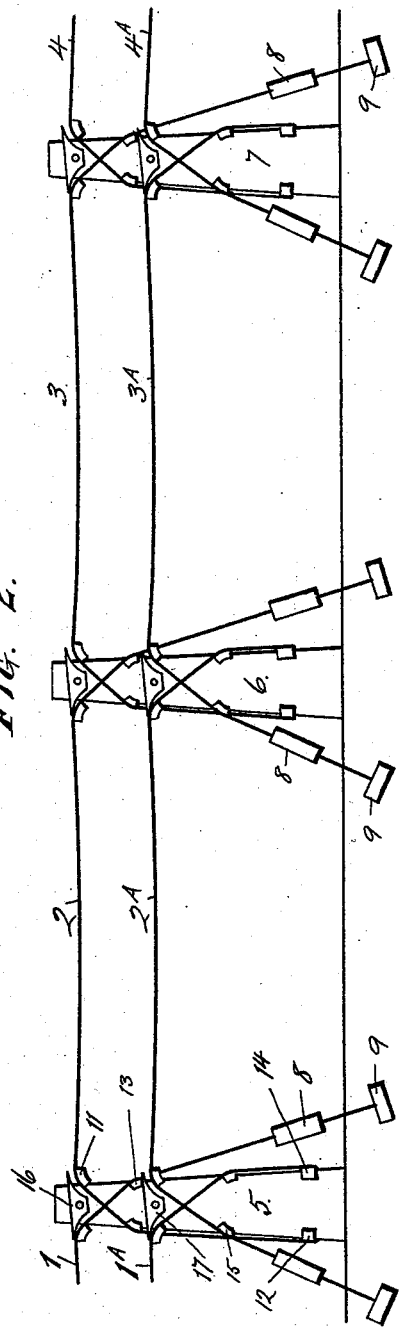
WITNESSES.
INVENTORS.

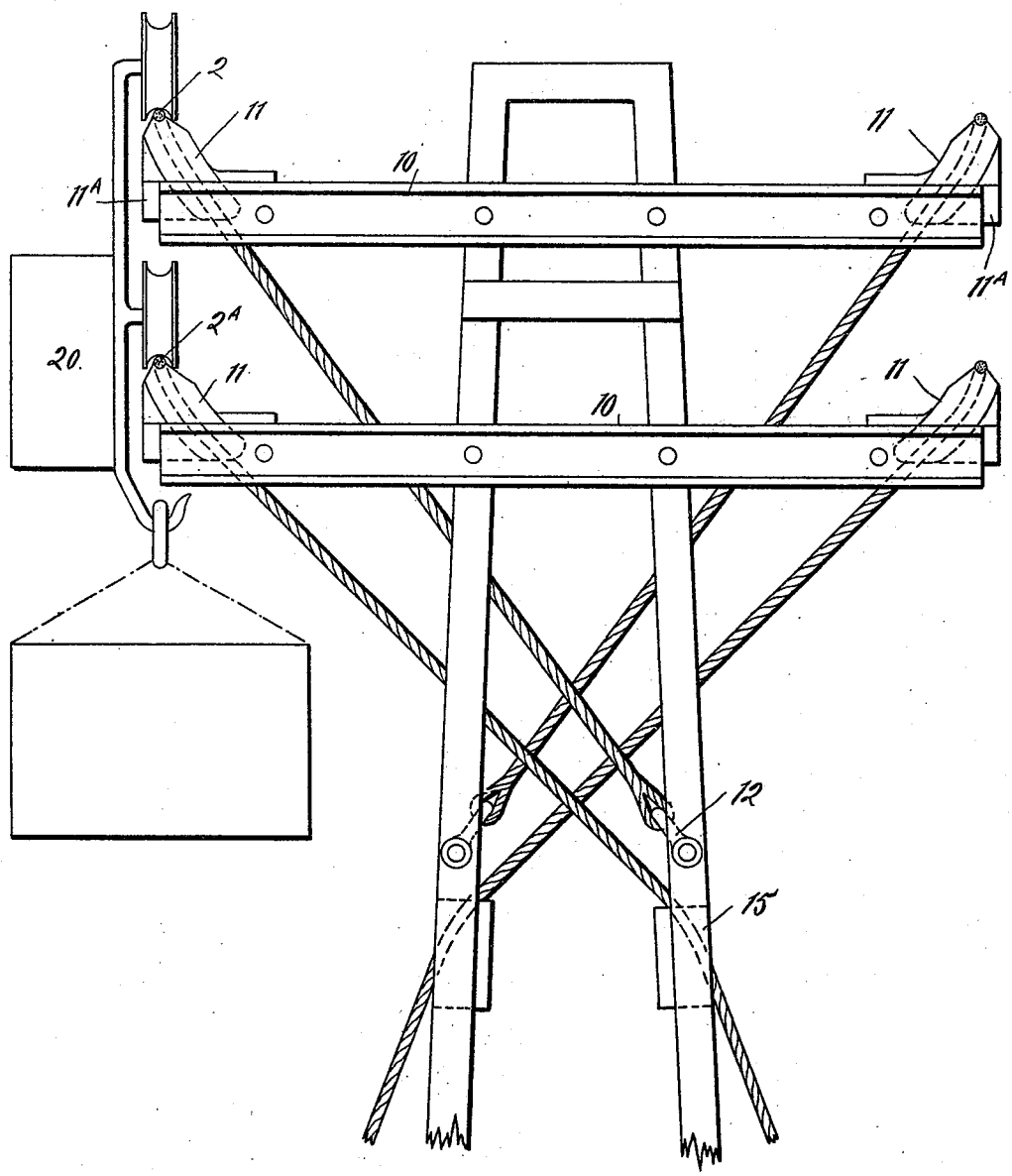

No. 614,046. Patented Nov. 8, 1898.
J. W. & H. WHITE.
AERIAL ROPEWAY.
(Application filed July 8, 1898.)
(No Model.) 5 Sheets—Sheet 3.
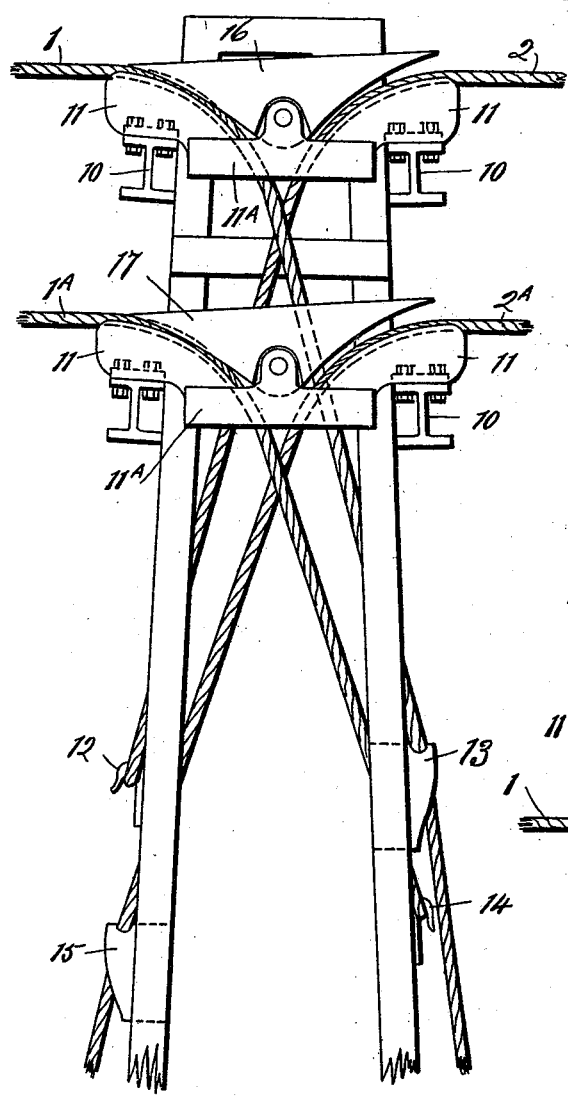
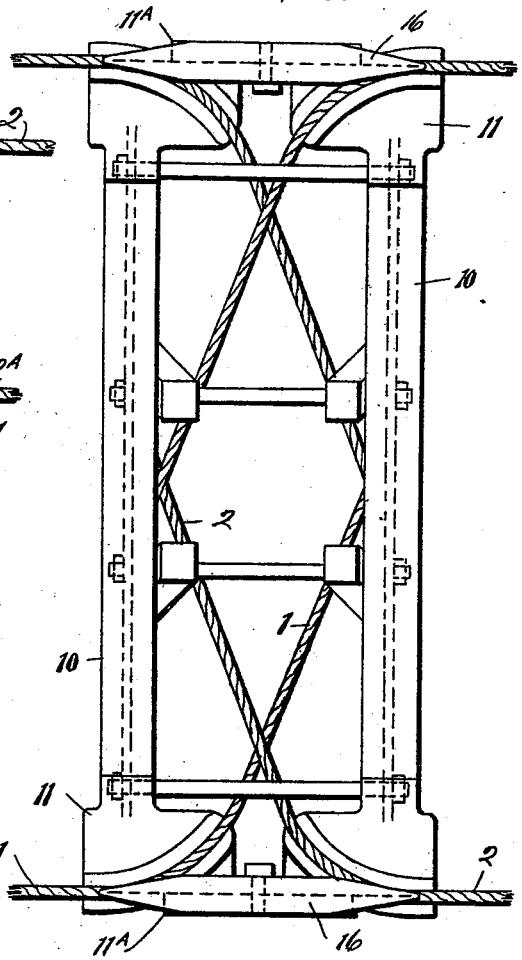
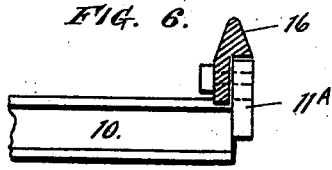
WITNESSES. INVENTORS.

No. 614,046. Patented Nov. 8, 1898.
J. W. & H. WHITE.
AERIAL ROPEWAY.
(Application filed July 8, 1898.)
(No Model.) 5 Sheets—Sheet 4.
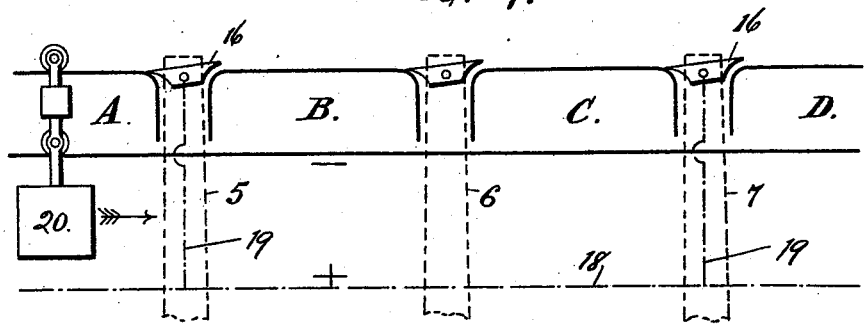
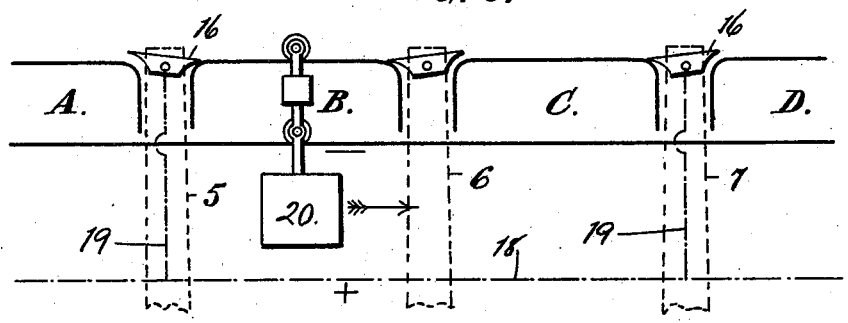
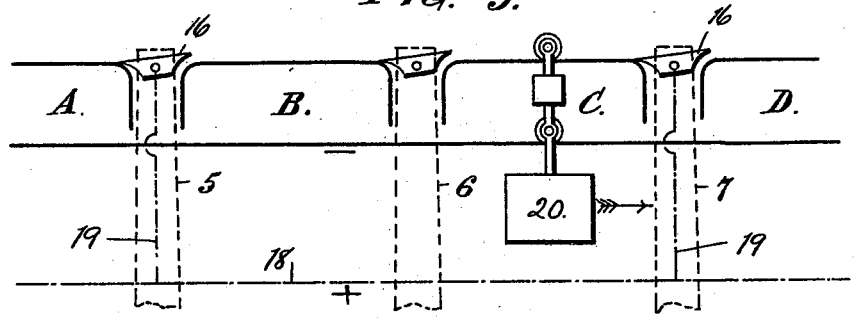
WITNESSES. INVENTORS.
Joseph Walwyn White
Herbert White
by
Att'ys
THE NORRIS PETERS CO., PHOTO-LITHO., WASHINGTON, D. C.

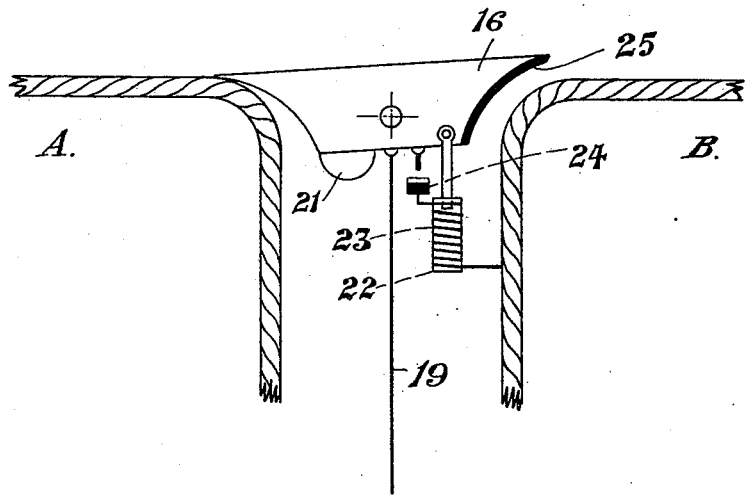

UNITED STATES PATENT OFFICE.

JOSEPH WALWYN WHITE AND HERBERT WHITE, OF WIDNES, ENGLAND.

AERIAL ROPEWAY.

SPECIFICATION forming part of Letters Patent No. 614,046, dated November 8, 1898.

Application filed July 8, 1898. Serial No. 685,445. (No model.)

*To all whom it may concern:*

Be it known that we, JOSEPH WALWYN WHITE and HERBERT WHITE, subjects of the Queen of Great Britain and Ireland, residing at The Old Public Hall, Widnes, county of Lancaster, England, have invented a certain new and useful Aerial Ropeway, (for which we have applied for patent in Great Britain on July 12, 1897, under No. 16,428,) of which the following is a specification.

This invention refers to aerial ropeways for the transport of merchandise and passengers.

Referring to the drawings, Figure 1 illustrates, diagrammatically, an aerial ropeway constructed according to our invention with a single carrying-rope. Fig. 2 shows an aerial ropeway comprising an upper and lower line of carrying-ropes. Fig. 3 is a side view of an intermediate supporting-post, Fig. 4 being a front view and Fig. 5 a plan. Fig. 6 is a detail. Figs. 7, 8, and 9 are three diagrams illustrating our scheme of electrical traction. Fig. 10 is a detail view.

According to this invention we employ a series of comparatively short ropes instead of one continuous rope. The first rope extends from a terminus to the first intermediate post, the second rope between the first and second posts, and so on to the other terminus. Each span of the ropeway thus consists of a separate rope and is complete in itself, communication between one rope and another being made by means of a rocking bridge-rail which rests alternately on each rope, a continuous pathway being thus provided for the wheels of the carrier. Each rope has separate straining arrangements.

In the case of an aerial ropeway on which electrical traction is employed we preferably construct it of two series of carrying-ropes, one above the other and insulated from each other. We supply electric current to the ropes of one series and use the ropes of the other series, which are electrically connected together, as the return-lead, the current passing from one series to the other through a motor carried by the carriage and through its wheels.

On reference to Fig. 1 it will be seen that we construct a ropeway of a series of ropes 1 2 3 4, each of which spans two supporting-posts, the latter being designated 5 6 7. Two lines of ropes are shown in Fig. 2, one being above the other, the lower ropes being designated $1^A$ $2^A$ $3^A$ $4^A$. Taking the rope 2 as an example of the others, it will be seen that one end passes over guides and is secured to the post 5, the other end of the rope passing downward over guides on the post 6 to a straining device 8 and a ground-anchor 9, or one end of the rope may be attached to a weight sufficiently heavy to keep it at the required tension, or any other customary method of straining ropes may be employed.

Figs. 3, 4, and 5 illustrate an arrangement of the supporting-post head whereby the rope ends are supported and secured. On the extremities of the cross-trees 10 are provided guides 11, over which the rope ends are led. Assuming the post shown to be the post 5 of Fig. 2, arranged for an "up-and-down" line, it will be seen that the rope 2 passes over a guide 11 and is secured to the post at 12, and the rope 1 is led downward over a guide 13 to a straining device or to a weight. The rope $1^A$ is similarly secured to the post at 14, and the rope $2^A$ is led downward over a guide 15 to a straining device.

In order that a continuous road may be provided for the carriage, we pivot a rail 16 between the ropes 1 and 2 and a similar rail 17 between the ropes $1^A$ and $2^A$. Such rails are pivoted, as shown in Fig. 6, to plates $11^A$, which are bolted to the guides 11. Where the traffic is in one direction only, such pivoted rail is depressed by a counterweight 21, Fig. 10, to the rope along which the trolley approaches.

In our system of electrical traction electric energy is conducted to one series of ropes, and the ropes of this series are insulated from the earth and one from the other by lining the rope-grooves in the guides 11 with vulcanite or in any other convenient manner. The carriage has two wheels or sets of wheels, one wheel or set of wheels running on one series and the other wheel or set of wheels running on the other series of ropes of a double ropeway. Electrical energy is transmitted through a motor on the trolley and is given up by the trolley to the series of ropes which form the return-lead. The separate ropes of the return series are electrically connected to each other, and they can be "earthed" at intervals in order to lessen the resistance of the return-circuit. We supply electrical energy to the ropeway in such a manner that the rope just traversed by a trolley is rendered incapable of supplying current to a succeeding trolley until the first trolley has traversed the next rope, thus providing an automatic block system, and we cause the trolley itself to switch on current to the rope upon which it is entering and to switch the current off the rope which it is quitting.

Referring to the diagram Figs. 7, 8, and 9, we conduct from end to end of the ropeway an insulated electric conductor 18, which may be supplied by any source of electrical energy. The four sections of ropeway shown in the diagrams are lettered A B C D. From the conductor 18 we lead branches 19 to the rocking rail 16 on every alternate post. The leads 19 energize (successively) the two ropes which lead to left and right of such electric supply or alternate posts, the ends of said ropes being insulated.

Fig. 7: It will be seen that the rail 16 on the post 5 is weighed down on the rope A by the counterweight 21. (Shown in Fig. 10.) It follows that the rope A will be a conductor until the trolley 20 (traveling in the direction of the arrow) crosses said rail. In the latter action the rail is rocked from the rope A onto the rope B. The rope A is now out of circuit, and B is energized in its stead.

Fig. 8: To retain the rail 16 against the tendency of its counterweight 21 in contact with the rope B, (whereby the latter may be a conductor while the rope A is not,) we prefer to employ an electromagnetic solenoid 22, whose coils 23 are in series with the lead 19 and the rope B when the mercurial contact 24 or an equivalent contact-maker is closed by the rocking of the rail 16, as shown in Fig. 10, whereby the solenoid is energized only so long as the rope B is a conductor—namely, so long as the trolley is upon it. In order that the current may pass from the rocker 16 to the rope B by way of the solenoid, the side of the rocker next to the rope B is provided with a layer of insulating material 25. The trolley 20 is now supplied with current from the post 5 until it reaches the post 6. In passing over the rocking rail on the post 6 the rope B is in turn cut out of circuit, owing to the solenoid 22 on post 5 being no longer energized and allowing its rocker 16 to again fall on and energize the rope A ready for the next trolley.

Fig. 9: The trolley 20 is now upon the rope C and obtains its current from the rocking rail upon the post 7.

Curves can be readily made without the special angle-stations hitherto required by merely using curved rocking bridge-rails instead of straight ones. Branch lines may diverge at intervals from the main line at intermediate posts, where the rocking rail will also be swiveled or otherwise moved, so as to become a switch, which may be put over to the branch or main line by a rod or gear operated from the ground or elsewhere.

What we claim as our invention, and desire to secure by Letters Patent, is—

1. A system of electrical traction comprising a plurality of sectional lines of carrying-ropes, one line being the conductor and the other the return line, rocking rails between the sections, electrical connections to alternate rocking rails of the conductor-line whereby every alternate section of such line is normally a conductor, said alternate rocking rails remaining in contact with the intermediate sections of the line while the trolley is on said intermediate sections, the said rocking rails which are intermediate of those electrically connected being arranged to cut out of circuit the section of the line quitted by the trolley whereby an advancing trolley automatically cuts out of circuit the section of rope which it is quitting and places in circuit, the section of line which it enters upon, substantially as described.

2. In the herein-described system of electrical traction, the combination of a sectional carrying-rope, rocking rails adapted to rock between the sections of such rope and so convey a trolley from section to section, an electrical conductor electrically connected with alternate rocking rails whereby the alternate sections of the carrying-rope on which the rails normally rest are electrical conductors, and means such as an electrical solenoid whose coils are in series (when the rocking rail is rocked by the trolley) between an electrical conducting rocking rail and a normally non-conducting section of carrying-rope, for keeping such rail depressed on said normally non-conducting section while a trolley is upon said section, whereby an advancing trolley automatically cuts out of circuit the section of rope which it is quitting and places in circuit the section of rope which it is entering upon, substantially as described.

3. In combination in a system of electrical traction, the upper and lower sectional lines, and the rocking rails 16 and 17 pivoted between the sections thereof, substantially as described.

In witness whereof we have hereunto set our hands in presence of two witnesses.

JOSEPH WALWYN WHITE.
HERBERT WHITE.

Witnesses:
JAMES WILLIAM MEIKLE,
JAMES ANDREW COUBROUGH.